Figure 1:
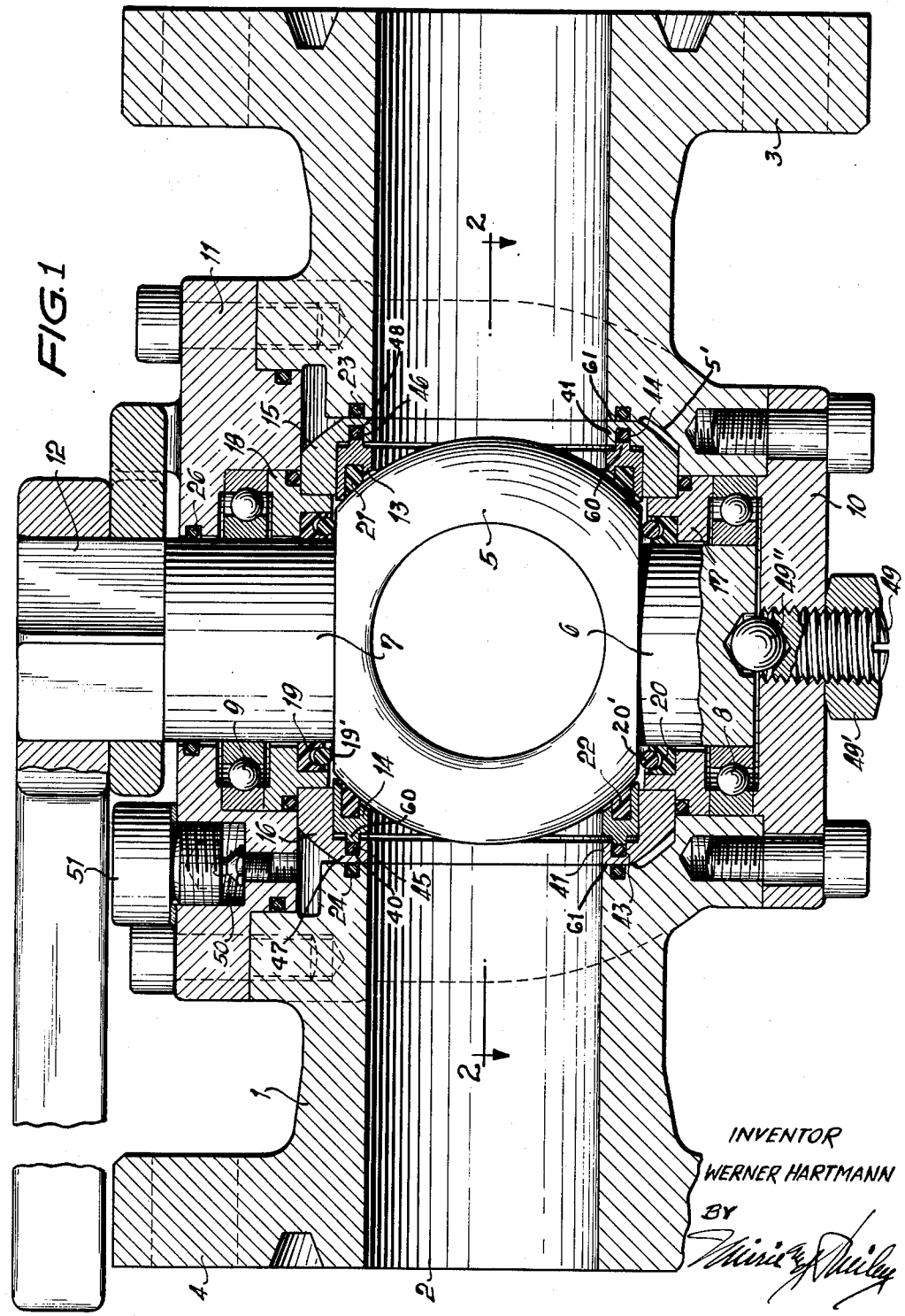

Oct. 26, 1965          W. L. HARTMANN          3,214,135
         VALVE WITH SPHERICAL PLUG AND FLOATING SEALING MEANS
Filed Nov. 10, 1960                              2 Sheets-Sheet 2

INVENTOR
WERNER HARTMANN

United States Patent Office 3,214,135
Patented Oct. 26, 1965

3,214,135
VALVE WITH SPHERICAL PLUG AND
FLOATING SEALING MEANS
Werner Ludwig Hartmann, 20a Ehlershausen,
Hannover, Germany
Filed Nov. 10, 1960, Ser. No. 68,454
Claims priority, application Germany, Nov. 12, 1959,
H 37,875
2 Claims. (Cl. 251—315)

The present invention relates to improvements in stopcocks having a spherical plug and, more particularly, relates to new and novel improvements in the stopcock construction disclosed in my United States Patent No. 2,885,179.

The construction disclosed in the above patent possesses many advantages. In spite of the use of a spherical plug, it is possible to install the plug in an undivided housing. It is also possible to assemble or dismantle the plug together with two complementary half shells that surround the plug and rigid sealing rings sealingly disposed between the plug and the half shells, without removing the stopcock housing from the pipeline. Therefore, all wear parts, particularly the plugs and the two sealing rings, may be easily inserted and removed. There will be no wear at the complementing surfaces between the two half shells and the housing bore, since these surfaces are not subject to relative sliding movement when the valve is operated.

In the patented structure, the half shells surrounding the ball plug are shaped as a cylinder at the outside or jacket surface and are inserted into a cylindrical chamber formed in the stopcock housing. The frontal areas of the sealing rings facing the ball plug are spherical, whereas the rear areas of the sealing rings, adjacent the half shells, are cylindrical. Consequently, the axial width or thickness of each sealing ring varies at different radii of the ring and is much greater in one plane than in the plane perpendicular thereto. Therefore, the line pressure results in different force effects in said different radial planes of the sealing rings.

When sealing rings of relatively small radial thickness are used, particularly with a flow passage of large diameter and under high line pressure conditions, the rings tend to be deformed from circular to nearly elliptical shape in circumference. Due to this deformation of the sealing rings, the sealing effect is substantially reduced. In addition, the sealing rings tend to tightly jam the guiding areas in the half shells so that they are unable to move axially in the direction of the flow passage towards the plug.

The present invention has for its primary object to retain the advantages of the patented structure while avoiding the disadvantages thereof by preventing an elliptical deformation of the sealing rings and by providing a construction between the sealing rings and the half shells whereby the sealing rings can move axially, parallel with the flow passage.

The foregoing object is attained by the present invention by providing a construction wherein the sealing rings each have a plane surface facing away from the plug and are sealed by O-rings to complementary plane surfaces, perpendicular to the axis of the flow passage, on each of the half shells, retaining the sealing rings against the plug, and the half shells each have a plane surface facing away from each of the sealing rings and are sealed by O-rings at complementary plane surfaces in the housing, perpendicular to the axis of the flow passage, while permitting removal from the housing of said sealing rings, half shells and ball plug, as a unit, through an open end in the chamber.

The sealing rings should be displaceable against the plug and against the corresponding inner surfaces of the half shells so as to be permitted to move axially, parallel with the axis of the flow passage, while still maintaining a sealed engagement with the plug and the half shells. By this, it is achieved that the sealing rings will be pressed by the line pressure tightly against the plug. Additionally it is achieved that, if the plug pivots tend to bend under high line pressure, the plug ball will be maintained in proper position by the sealing rings. Such displaceable arrangement of the sealing rings will decrease wear and tear on the ball plug and the sealing rings. To permit such movement of the sealing rings to be achieved, an interfitting or innerengaging arrangement is provided between the sealing rings and the half shells, which arrangement comprises an annular tongue or flange and groove on the complementary planar surfaces of the sealing rings and the half shells with a gasket seated in the base of the grooves.

It is intended to design the housing and the half shells in a manner so that working material can be saved. In this respect, the stopcocks are often made of corrosion-proof materials, particularly stainless steel. With regard to material saving and manufacturing economy, it is important to note that the outside surfaces of the half shells and the interior surface of the chamber need be accurately machined only at the zones adjacent the flow passage bore in the housing. The cavity resulting between the half shells and the chamber may be conveniently filled with grease.

Figure 2:
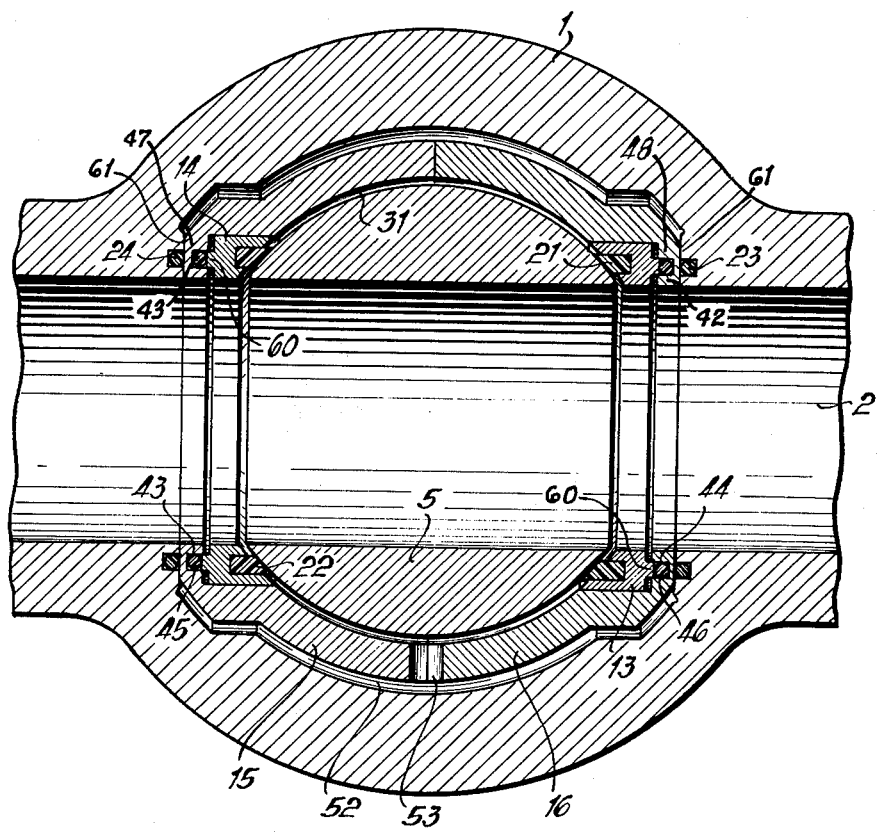

The novel features that are considered characteristic of the invention are set forth with particularity in the appended claims. The invention itself, however, both as to its organization and its method of operation, together with additional objects and advantages thereof, will best be understood from the following description of a preferred embodiment when read in connection with the accompanying drawings, wherein like reference characters indicate like parts throughout the several figures and wherein:

FIG. 1 is a cross-sectional view of a stopcock construction according to the present invention, taken on a plane through the axis of the flow passage, and FIG. 2 is a cross-sectional view taken on line 2—2 of FIG. 1.

Referring now more particularly to the accompanying drawings, the undivided stopcock housing 1 is provided with a flow passage 2 and, at its ends, is provided with mounting flanges 3 and 4 for connection thereof in a pipeline. A spherical ball shaped plug 5 is rotatably disposed in a chamber 5' formed in the housing and transversely intersecting the flow passage 2 so that the spherical plug 5 has a spherical outer surface which is disposed in the flow passage 2 to close off the flow passage, the ball plug being formed with a diametrical opening, selectively alignable with the flow passage upon rotation of the ball plug to permit the flow of fluid through the passage 2.

The opposing flat ends of the ball plug 5 are provided with projecting pivots 6 and 7 which are journaled in bearings 8 and 9. The pivot 6 is journaled in the lower end of the chamber which is closed off by the plate 10, while the pivot 7 is journaled in the cover 11 for the open end of the chamber.

For the adjustment of the level of the ball plug 5 in the chamber, so as to position the ball plug in a proper operating position in the passage 2, an adjustment screw 49 is provided in the plate 10, the inner end of the screw 49 supporting a ball 49" which engages the lower pivot 6; the screw being locked by a nut 49'.

The spherical surface of the ball plug 5 is surrounded completely by two symmetrical half shells 15 and 16, each of 180° extent and having a ball shaped interior surface 31. Rigid sealing rings 13 and 14 are provided and are disposed between the ball plug and the half shells 15 and 16, coaxial to the flow passage 2 in the housing 1. The sealing rings 13 and 14 have inner frontal areas, confronting the plug and shaped as a ball zone or spherical end surface within which elastic gaskets 21 and 22 are inserted and bear against the peripheral surface of the ball plug. Each rigid sealing ring is shaped as a plane at its rear end area away from the plug 5, so that each rigid sealing ring has an outer end surface facing away from the plug and formed as a plane surface perpendicular to the axis of the flow passage 2. The rings, therefore, represent a solid of rotation so that they are uniformly acted on radially in all directions by the line pressure acting on the inner and outer end surfaces of the rings. An elliptical deformation of the rings is thereby avoided.

The ball shaped half shells 15 and 16 have annular openings 41 of a diameter substantially equal to the diameter of the flow passage 2. The portions 48 and 47 of the half shells, which portions suround the openings 41 in the half shells, are flattened and may be said to be tubular extensions. The flat tubular portions 48 and 47 are formed with inner plane surfaces confronting the outer plane end surfaces of the sealing rings and are formed with outer plane surfaces confronting the plane surfaces 61 of the chamber, such chamber plane surfaces being disposed perpendicular to the flow passage 2. The half shells 15 and 16 are inserted into the chamber in the housing 1 through the open end of the chamber, together with the plug 5 and the sealing rings 13 and 14. The complementary half shells 15 and 16 are held against a displacement relative to the housing 1 if the plug is rotated and are immovably secured in the direction of the flow passage 2 in the housing 1 by bearing against each other, as shown in FIG. 2.

The outer end planar surfaces of the portions 48 and 47 of the half shells 15 and 16 and the complementary and confronting planar portions 61 of the chambers are sealed by O-rings 23 and 24 which are inserted into ring grooves in the chamber wall formed in the housing 1. The outer planar end surfaces of the sealing rings 13 and 14 confront the inner end plane surfaces of the portions 48 and 47 of the half shells and are sealed thereto by interfitting or interengaging means, which permits axial movement of the sealing rings 13 and 14, parallel with the longitudianl axis of the flow passage 2. In this respect, the outer planar end surface of each sealing ring is formed with annular flanges 60, the flanges fitting in a complementary grooves 43 and 44 formed in the inner end plane surfaces of each of the portions 48 and 47 of the half shells. O-rings 45 and 46 are seated in the bases of the grooves 43 and 44.

The relative construction of the flanges, grooves and O-rings is such that the complementary outer end planar surfaces of the sealing rings and the inner end planar surfaces of the portions 48 and 47 of the half shells do not meet ordinarily and, thereby, provision is made for sealed axial movement of the rigid sealing rings along the axis of the flow passage while still maintaining the gaskets 21 and 22 in sealing contact with the spherical peripheral surface of the ball plug 5. A proportionally axial displacement of the sealing rings 13 and 14 may become necessary because the plug pivots may bend under high pressure and, in spite of this, the plug must not be supported by the sealing ring 13 or 14 on the side away from the pressure, which would occasion more difficulties in dismantling and increase the wear between the plug and the sealing rings 13 and 14.

As shown in FIG. 1, the pivots 6 and 7 of the plug, which project in opposite directions from the opposing flattened ends of the plug, are inserted through elastic grooved rings 19 and 20 supported by rigid rings 17 and 18 interiorly of the bearings 8 and 9. The rings 19 and 20 support O-rings 19' and 20' which engage the ends of the plug and the pivots and provide seals for the pivots interiorly of the bearings 8 and 9. The upper pivot 7 is sealed exteriorly of the bearings 9 by an O-ring 26 provided in the chamber cover 11. The ring engages the upper plug pivot, which extends above the cover 11, and terminates in a square cross head 12 for receiving means for rotating the ball plug 5 in the chamber.

The space 52 between the interior wall of the chamber and the exterior surfaces of the half shells 15 and 16 is filled with a lubricating medium which may be introduced through a fitting 50 provided in the cover and having a stopper 51. The lubricating medium passes through the opening 53 to enter the space 31 between the half shells and the ball plug to provide a lubrication of the ball plug surface mating with the half shells. This construction prevents impurities from the fluid in the passage 2 from penetrating the space 31 between the plug 5 and the half shells 15 and 16, and also prevents the lubrication medium from being pressed towards the exterior under the pressure of the line medium.

Although a preferred embodiment of the present invention has been described herein and illustrated in the accompanying drawings, it is obvious that other modifications may be realized, as come within the spirit and scope of the appended claims.

I claim:

1. A stopcock comprising an undivided stopcock housing a flow passage and a chamber formed in the housing and intersecting said passage, said chamber having an open end extending through the housing, perpendicular to the flow passage, closure means for said open end, a valve plug removably mounted in said chamber and rotatable therein and having a spherical ball portion interposed in the flow passage, said ball portion being formed with a diametrical flow opening alignable with the flow passage to permit a flow of fluid through the flow passage, a pair of complementary half shells completely surrounding the spherical ball portion and mating with each other and removably mounted in said chamber, each of said half shells having an opening of a diameter substantially equal to the diameter of the flow passage and with which the opening in the valve ball portion is selectively alignable, each half shell having a portion surrounding the opening therein and disposed perpendicular to the flow passage in the housing, said portions each having an inner plane end surface and an outer plane end surface, a rigid sealing ring disposed between the plug and the said portion of each half shell, said rings each having a spherical inner end surface sealingly engaging the plug and each having an outer end surface facing away from the plug and formed as a plane surface perpendicular to the axis of the flow passage, said outer planar end surfaces of the rings confronting the inner plane end surfaces of the portions of the half shells, offset surfaces relative to said end surfaces providing interengaging sealed means between said confronting planar portions enabling sealed axial movement of the sealing rings parallel to the flow passage while maintaining the spherical end surfaces of the rings in sealing engagement with the plug, said chamber having planar surfaces confronting the outer end planar surfaces on the portions of the half shells and sealing means between the chamber planar surfaces and the outer end planar surfaces on the portions of the half shells, with the sealing rings, the half shells and the valve plug, as a unit, being removable from the housing through the open end of said chamber.

2. A stopcock, as claimed in claim 1, wherein said interengaging means includes a flange and groove arrangement between the inner end plane surfaces of the portions of each of the half shells and the planar outer end surfaces of each of the sealing rings with a gasket seated in the base of the groove and interposed between the flange and the groove.

(References on following page)

References Cited by the Examiner

UNITED STATES PATENTS

| | | | |
|---|---|---|---|
| 477,605 | 6/92 | Pratt | 251—316 |
| 2,868,497 | 1/59 | Graham | 251—317 XR |
| 2,868,498 | 1/59 | Kaiser | 251—315 XR |
| 2,885,179 | 5/59 | Hartmann | 251—315 |
| 3,000,393 | 9/61 | Maynard | 251—317 XR |
| 3,041,036 | 6/62 | McFarland | 251—317 XR |
| 3,096,966 | 7/63 | McFarland | 251—315 XR |

FOREIGN PATENTS 567,554  12/58  Canada.

ISADOR WEIL, *Primary Examiner.*
M. CARY NELSON, *Examiner.*